(12) United States Patent
Kim et al.

(10) Patent No.: US 12,518,172 B2
(45) Date of Patent: Jan. 6, 2026

(54) SYSTEM AND METHOD USING SEPARABLE TRANSFER LEARNING-BASED ARTIFICIAL NEURAL NETWORK

(71) Applicant: Han Soo Lee, Busan (KR)

(72) Inventors: Young Jae Kim, Seoul (KR); Han Soo Lee, Busan (KR)

(73) Assignee: Han Soo Lee, Busan (KR)

( * ) Notice: Subject to any disclaimer, the term of this patent is extended or adjusted under 35 U.S.C. 154(b) by 1081 days.

(21) Appl. No.: 17/532,140

(22) Filed: Nov. 22, 2021

(65) Prior Publication Data

US 2023/0099087 A1    Mar. 30, 2023

Related U.S. Application Data

(63) Continuation of application No. PCT/KR2021/013174, filed on Sep. 28, 2021.

(51) Int. Cl.
*G06N 3/096* (2023.01)
*G06N 3/02* (2006.01)
(Continued)

(52) U.S. Cl.
CPC ............ *G06N 3/096* (2023.01); *G06N 3/02* (2013.01); *G06N 3/045* (2023.01); *G06N 3/08* (2013.01);
(Continued)

(58) Field of Classification Search
CPC .......... G06N 3/08; G06N 20/00; G06N 3/006; G06N 3/02; G06N 3/04; G06N 3/045;
(Continued)

(56) References Cited

U.S. PATENT DOCUMENTS

| 10,572,828 B2 | 2/2020 | Crabtree et al. |
| 2017/0193400 A1 | 7/2017 | Bhaskar et al. |

(Continued)

FOREIGN PATENT DOCUMENTS

| KR | 10-2014-0119529 A | 10/2014 | |
| KR | 10-2020-0000824 A | 1/2020 | |
| WO | WO-2021167998 A1 * | 8/2021 | ......... G06Q 30/0206 |

OTHER PUBLICATIONS

Yang et al., "AutoFT: Automatic Fine-Tune for Parameters Transfer Learning in Click-Through Rate Prediction" Jun. 9, 2021, arXiv: 2106.04873v1, pp. 1-10. (Year: 2021).*

(Continued)

*Primary Examiner* — Miranda M Huang
*Assistant Examiner* — Chase P. Hinckley
(74) *Attorney, Agent, or Firm* — United One Law Group LLC; Kongsik Kim; Jhongwoo Peck

(57) ABSTRACT

Disclosed herein is a computing system using machine learning-based artificial intelligence. The computing system includes at least one processor, a first artificial neural network configured to pre-train on a first phase task based on a first dataset, a second artificial neural network configured to pre-train on a second phase task based on a second dataset, and a target artificial neural network configured to train on a target task based on a target dataset. The at least one processor transfers the parameter of the first phase layer of the first artificial neural network to the first phase layer of the target artificial neural network, transfers the parameter of the second phase layer of the second artificial neural network to the second phase layer of the target artificial neural network, and performs control so that the target artificial neural network performs fine-tuning training on the target task.

9 Claims, 10 Drawing Sheets

(51) Int. Cl.
| | |
|---|---|
| *G06N 3/045* | (2023.01) |
| *G06N 3/08* | (2023.01) |
| *G06N 20/00* | (2019.01) |
| *A61B 5/11* | (2006.01) |
| *A61F 5/01* | (2006.01) |
| *G06F 1/16* | (2006.01) |
| *G06N 3/04* | (2023.01) |

(52) U.S. Cl.
CPC ............ *G06N 20/00* (2019.01); *A61B 5/1117* (2013.01); *A61F 2005/0183* (2013.01); *G06F 1/163* (2013.01); *G06N 3/04* (2013.01)

(58) Field of Classification Search
CPC .......... G06N 3/084; G06N 7/01; G06N 3/096; A61F 2005/0183; A61B 5/1117; G06F 1/163

See application file for complete search history.

(56) References Cited

U.S. PATENT DOCUMENTS

| | | | | |
|---|---|---|---|---|
| 2018/0341832 | A1 | 11/2018 | Uhlenbrock et al. | |
| 2020/0065689 | A1 | 2/2020 | Vasudevan et al. | |
| 2020/0082210 | A1 | 3/2020 | Watson et al. | |
| 2020/0082275 | A1 | 3/2020 | Sun et al. | |
| 2020/0104706 | A1* | 4/2020 | Sandler ................. | G06N 3/045 |
| 2020/0104710 | A1* | 4/2020 | Vasudevan ............. | G06N 3/045 |
| 2020/0160212 | A1* | 5/2020 | Shin ....................... | G06N 3/045 |
| 2020/0205746 | A1* | 7/2020 | Burwinkel ......... | G08B 21/0446 |
| 2020/0380359 | A1* | 12/2020 | Finnie ..................... | G06F 18/24 |
| 2021/0034976 | A1* | 2/2021 | Arik ......................... | G06N 3/04 |
| 2021/0049410 | A1* | 2/2021 | Dierkes ..................... | G06N 3/08 |
| 2021/0073624 | A1* | 3/2021 | Yoo .......................... | G06N 3/04 |
| 2021/0125077 | A1* | 4/2021 | Fidler ..................... | G06N 3/08 |
| 2021/0319303 | A1* | 10/2021 | Lee ......................... | G06N 3/045 |
| 2022/0108171 | A1* | 4/2022 | Puigcerver i Perez .. | G06N 3/08 |
| 2022/0122001 | A1* | 4/2022 | Choe ....................... | G06N 20/20 |
| 2022/0189612 | A1* | 6/2022 | Zhai ....................... | G06N 3/045 |
| 2022/0222817 | A1* | 7/2022 | AlRegib ................. | G06V 10/82 |
| 2022/0409098 | A1* | 12/2022 | McDaid ................. | A61H 1/024 |
| 2023/0153631 | A1* | 5/2023 | Choi ..................... | G06F 18/213 706/15 |
| 2023/0196211 | A1* | 6/2023 | Ruiz ....................... | G06N 3/045 706/12 |
| 2024/0338571 | A1* | 10/2024 | Marrero ................. | G06N 5/022 |

OTHER PUBLICATIONS

Zhu et al., "Boundary-weighted Domain Adaptive Neural Network for Prostate MR Image Segmentation" Aug. 15, 2019, arXiv:1902.08128v2, pp. 1-11. (Year: 2019).*

Yan et al., "Neural Data Server: A Large-Scale Search Engine for Transfer Learning Data" Apr. 1, 2020, arXiv: 2001.02799v3, pp. 1-13. (Year: 2020).*

Chen et al., "User-specific Adaptive Fine-tuning for Cross-domain Recommendations" Jun. 18, 2021, arXiv: 2106.07864v2, pp. 1-12. (Year: 2021).*

Su et al., "Transferable Knowledge-Based Multi-Granularity Aggregation Network for Temporal Action Localization" Jul. 27, 2021, arXiv: 2107.12618v1, pp. 1-9. (Year: 2021).*

Vrbanic et Podgorelec, "Transfer Learning with Adaptive Fine-Tuning" Nov. 10, 2020, IEEE Access, pp. 196197-196211. (Year: 2020).*

Xu et al., "Boundary-sensitive Pre-training for Temporal Localization in Videos" Mar. 26, 2021, arXiv: 2011.10830v3, pp. 1-12. (Year: 2021).*

You et al., "LogME: Practical Assessment of Pre-trained Models for Transfer Learning" Jun. 23, 2021, arXiv: 2102.11005v3, pp. 1-13. (Year: 2021).*

Zhang et al., "Collaboration of Experts: Achieving 80% Top-1 Accuracy on ImageNet with 100M FLOPs" Jul. 8, 2021, arXiv: 2107.03815v1, pp. 1-16. (Year: 2021).*

Guo et al., "SpotTune: Transfer Learning through Adaptive Fine-tuning" Nov. 21, 2018, arXiv: 1811.08737v1, pp. 1-10. (Year: 2018).*

Liu et al., "TransTailor: Pruning the Pre-trained Model for Improved Transfer Learning" Mar. 2, 2021, arXiv: 2103.01542v1, pp. 1-8. (Year: 2021).*

Zhang et al., "Parameter Transfer Unit for Deep Neural Networks" Apr. 23, 2018, arXiv: 1804.08613v1, pp. 1-7. (Year: 2018).*

Rokni et al., "TransNet: Minimally Supervised Deep Transfer Learning for Dynamic Adaptation of Wearable Systems" Sep. 2020, pp. 1-31. (Year: 2020).*

Yhdego et al., "Towards MusculoSkeletal Simulation-Aware Fall Injury Mitigation: Transfer Learning with Deep CNN for Fall Detection" 2019, pp. 1-19. (Year: 2019).*

Shi et al., "Mobile Human Airbag System for Fall Protection Using MEMS Sensors and Embedded SVM Classifier" May 2009, pp. 495-503. (Year: 2009).*

\* cited by examiner

SYSTEM AND METHOD USING SEPARABLE TRANSFER LEARNING-BASED ARTIFICIAL NEURAL NETWORK

CROSS-REFERENCE TO RELATED APPLICATION

This application is a Continuation of PCT/KR2021/013174 filed on Sep. 28, 2021, which is incorporated herein by reference in its entirety.

TECHNICAL FIELD

The present invention relates to a system and method to which a learning/training technique and network improved over the prior art are applied in a learning/training process using machine learning-based artificial intelligence. More particularly, the present invention relates to a system and method using artificial neural network-based artificial intelligence that have a hierarchical structure capable of executing separable transfer learning.

The present invention was derived from the research conducted as part of the Preliminary Startup Package Project sponsored by the Korean Ministry of SMEs and Startups and the Korea Institute of Startup & Entrepreneurship Development [Project management number: 10224348; Project name: Smart Protector System for Preventing Injuries of the Elderly due to Falls].

BACKGROUND

Recently, widely popularized mobile devices, smart devices, or wearable devices provide healthcare-related information for the management of the health of users, and users are receiving assistance with their health management based on smart devices.

Smart devices are used as a healthcare device that detects human biosignals and provides health information, and are also used as a wearable airbag device that can be worn on the waist and is configured such that an acceleration sensor or an angular velocity sensor detects the acceleration or angular velocity of a wearer, detects the risk of a fall, and deploys an airbag before the wearer comes into collision with the ground, as disclosed in Korean Patent Application Publication No. 10-2014-0119529 entitled "Device for Protecting Human Body, and Motion Control System and Method thereof." As described above, the field of application of smart devices is rapidly expanding.

The process of analyzing the sensing data of these smart devices is performed via a pattern recognition technique. In order to effectively recognize complex and diverse patterns, recently developed artificial neural network (ANN) technology is applied. The development of artificial neural networks has dramatically improved the performance of existing machine learning techniques. For this reason, artificial neural network technology is being attempted to be applied in various fields. For example, artificial neural network technology is applied to the task of segmenting or detecting an object in an image and classifying the object in the image, and thus is used for various purposes in image processing. For example, in medical image processing, an object in an image is segmented, detected, and classified based on the brightness values or intensity values of the image. In this case, the object may be an organ or a lesion of the human body.

In the automation of an image processing process, the recent introduction of deep learning and a convolutional neural network (CNN) as an artificial neural network has dramatically improved the performance of an automated image processing process.

Transfer learning is being attempted as one method for improving the performance of an artificial neural network. Korean Patent Application Publication No. 10-2020-0000824 entitled "Deep Learning Model-based Face Expression Recognition Method using Central Variance Loss Function" and U.S. Patent Application Publication No. US 2020/0082210 entitled "Generating and Augmenting Transfer Learning Datasets with Pseudo-Labeled Images" disclose attempts to improve the performance of an artificial neural network using transfer learning.

In Korean Patent Application Publication No. 10-2020-0000824, a pre-trained artificial neural network can be used as a feature extractor, and another model can be trained using extracted features. The training of a new model is called fine-tuning, which is introduced from the motivation to improve the final performance of an artificial neural network.

In U.S. Patent Application Publication No. US 2020/0082210, there is applied a transfer learning technique that performs the unsupervised pre-training of a convolutional neural network (CNN) and transfers parameters of the pre-trained CNN to a CNN for supervised fine-tuning.

Transfer learning is known to be utilized when it is necessary to extract more complex features such as facial expressions rather than to simply recognize a face. It is also known that transfer learning is utilized when data does not have a balanced distribution and imbalanced data needs to be used.

Although transfer learning has the potential to improve the performance of an artificial neural network, there is a problem in that the possibility of performance improvement or the degree of performance improvement attributable to transfer learning cannot be predicted. Accordingly, there is a need for research into this issue.

SUMMARY

An object of the present invention is to propose a machine learning-based artificial neural network learning/training technique that can improve the performance of an artificial neural network even when it is necessary to use imbalanced data or when there is insufficient data required for learning and thus learning is performed using a small amount of data.

An object of the present invention is to propose an artificial neural network learning/training technique that can be applied to various fields of application (medical imaging, face recognition, image recognition for vehicle autonomous driving, natural object image recognition, etc.) and can be applied to various tasks (classification, segmentation, object detection, generative model, etc.).

Another object of the present invention is to propose an artificial neural network learning/training technique that can be applied not only to learning based on image data but also to learning based on text data or sensor data.

Recently, continuous efforts have been made to improve the performance of image segmentation, object detection, and classification techniques by applying deep learning-based artificial intelligence techniques. However, in the case of deep learning-based artificial intelligence, the fact that a user cannot know whether a result provided from the operation of the deep learning-based artificial intelligence exhibits high performance by chance or whether the result has undergone an appropriate determination process for a task, i.e., the fact that the operation of deep learning-based artificial intelligence is a type of black box, limits the possibility of the utilization of deep learning-based artificial intelligence.

Although research results suggest that the performance of artificial neural networks is improved even when transfer learning is used, quantified guidelines for the application of transfer learning to improve the performance of an artificial neural network have not been proposed.

Another object of the present invention is to provide quantified guidelines for transfer learning that can improve the performance of an artificial neural network by proposing separable transfer learning while utilizing the advantages of artificial neural network learning/training using conventional transfer learning.

Another object of the present invention is to reduce the load of an iterative training process for providing quantified guidelines for transfer learning by proposing separable transfer learning. The present invention can induce quantified guidelines for transfer learning to be effectively acquired by effectively selecting datasets of an iterated process.

An object of the present invention is to propose a self-management platform that utilizes separable transfer learning to learn the relationship between the user experience data and personal characteristic information of a user for self-management and recommends user experience data suitable for the user as a self-management process based on the learning. An object of the present invention is to provide artificial intelligence technology to a self-management platform, thereby offering support so that the self-management platform can effectively predict a self-management process for self-management.

An object of the present invention is to support a self-management process for the healthcare and injury prevention of a user by analyzing the personal characteristic information and user experience data of the user and to recommend the user experience of another person and a related product for the healthcare and injury prevention of the user in association with various smart wearable devices.

In particular, an object of the present invention is to provide a self-management platform that can provide notification of the wearing of equipment such as a smart hip protection airbag for performing protection of the hip/hip joint to prevent injury to the elderly and can manage the health of a user.

An object of the present invention is to provide a separable transfer learning-based system and method that can receive the sensing data of smart devices, e.g., electrocardiogram (ECG), photoplethysmogram (PPG), galvanic skin response (GSR), skin temperature, humidity, and electroencephalogram (EEG) signals as biosignals, and can recognize the pattern of the signals.

An object of the present invention is to propose a system and method that utilize separable transfer learning for the purpose of identifying the activity and motion of a user and, for this purpose, recognize the pattern of the data of a gyroscope, an accelerometer, and an altitude sensor, a pressure sensor, a proximity sensor, and/or the like. The pattern recognition technology of the present invention may be used for a rotation sensor, a gravity sensor, an angular sensor, and the like as a virtual sensor.

In particular, an object of the present invention is to propose an analysis technique that, when a device such as a smart hip protection airbag configured to protect the hip/hip joint to prevent injury is worn, detects the risk of a fall of a user by detecting the movement of the user and effectively deploys an airbag before the user comes into collision with the ground.

According to an aspect of the present invention, there is provided a computing system using machine learning-based artificial intelligence, the computing system including: at least one processor; a first artificial neural network configured to pre-train on a first phase task based on a first dataset; a second artificial neural network configured to pre-train on a second phase task based on a second dataset; and a target artificial neural network configured to train on a target task based on a target dataset.

The at least one processor transfers the parameter of the first phase layer of the first artificial neural network to the first phase layer of the target artificial neural network after the pre-training of the first artificial neural network, transfers the parameter of the second phase layer of the second artificial neural network to the second phase layer of the target artificial neural network after the pre-training of the second artificial neural network, and performs control so that the target artificial neural network performs fine-tuning training on the target task after the transfer of the parameter of the first phase layer of the first artificial neural network and the transfer of the parameter of the second phase layer of the second artificial neural network. In this case, the "parameter" may be defined to include a weight stored by the layer of the artificial neural network through learning/training.

The at least one processor may control the first artificial neural network and the second artificial neural network so that a process in which the first artificial neural network pre-trains on the first phase task based on the first dataset and a process in which the artificial neural network pre-trains on the second phase task based on the second dataset are performed independently of each other.

The at least one processor may set a plurality of candidate values for phase layer region information based on which the first phase layer and the second phase layer are distinguished in the target artificial neural network.

For each of the plurality of candidate values, the at least one processor may perform the process of transferring the parameter of the first phase layer of the first artificial neural network to the first phase layer of the target artificial neural network and the process of transferring the parameter of the second phase layer of the second artificial neural network to the second phase layer of the target artificial neural network.

The at least one processor may acquire optimal phase layer region information for the phase layer region information from among the plurality of candidate values so that the target artificial neural network can optimize prediction accuracy for the target task.

The at least one processor may set policies for reinforcement learning so that they can correspond to the plurality of candidate values for the phase layer region information.

The at least one processor may acquire the optimal phase layer information by performing fine-tuning training corresponding to the above policies, setting test accuracy for the target task as a reward of the reinforcement learning, and then performing the reinforcement learning.

The target task, the first phase task, and the second phase task may be the tasks of analyzing an image. The first dataset may be a dataset selected to allow a low-level feature to be extracted more easily than the second dataset, and the second dataset may be a dataset selected to allow a high-level feature to be extracted more easily than the first dataset.

The first dataset may be a dataset selected based on a score of relevance to first basic image data corresponding to the low-level feature, and the second dataset may be a dataset selected based on a score of relevance to second basic image data corresponding to the high-level feature.

The computing system may further include a third artificial neural network configured to pre-train on a third phase task based on a third dataset. The at least one processor may transfer the parameter of the third phase layer of the third artificial neural network to the third phase layer of the target artificial neural network after the pre-training of the third artificial neural network.

The at least one processor may perform control so that the target artificial neural network performs fine-tuning training on the target task after the transfer of the parameter of the first phase layer of the first artificial neural network, the transfer of the parameter of the second phase layer of the second artificial neural network, and the transfer of the parameter of the third phase layer of the third artificial neural network.

The target dataset, the first phase dataset, and the second phase dataset may be selected based on the personal characteristic information and schedule and lifestyle data of a user.

The at least one processor may infer a time point, at which a need for the user to wear a smart wearable device is recognized to be high, based on the results of learning for the schedule and lifestyle data of the user.

In this case, the smart wearable device may include at least one of a smart hip protection for preventing an injury to the user and a smart healthcare device capable of detecting biosignals.

According to another aspect of the present invention, there is provided a computing system using machine learning-based artificial intelligence, the computing system including: at least one processor; a first artificial neural network configured to pre-train on a first phase task based on a first dataset; and a second artificial neural network configured to pre-train on a second phase task based on a second dataset.

The at least one processor may select any one of the first artificial neural network and the second artificial neural network as a target artificial neural network configured to train on a target task based on a target dataset after the pre-training of the first artificial neural network and the pre-training of the second artificial neural network.

When the second artificial neural network is selected as the target artificial neural network, the at least one processor transfers the parameter of the first phase layer of the first artificial neural network to the first phase of the target artificial neural network after the pre-training of the first artificial neural network.

When the first artificial neural network is selected as the target artificial neural network, the at least one processor transfers the parameter of the second phase layer of the second artificial neural network to the second phase of the target artificial neural network after the pre-training of the second artificial neural network.

The at least one processor performs control so that the target artificial neural network performing fine-tuning training on the target task after the transfer of the parameter of the first phase layer of the first artificial neural network or the transfer of the parameter of the second phase layer of the second artificial neural network to the target artificial neural network.

According to another aspect of the present invention, there is provided an artificial neural network training method executed in a computing system including a machine learning-based artificial neural network, the artificial neural network training method including: controlling, by at least one processor in a computing system, the pre-training of a first artificial neural network so that the first artificial neural network pre-trains on a first phase task based on a first dataset; controlling, by the at least one processor, the pre-training of a second artificial neural network so that the second artificial neural network pre-trains on a second phase task based on a second dataset; transferring, by the at least one processor, the parameter of the first phase layer of the pre-trained first artificial neural network to the first phase layer of a target artificial neural network; transferring, by the at least one processor, the parameter of the second phase layer of the pre-trained second artificial neural network to the second phase layer of the target artificial neural network; and controlling, by the at least one processor, the fine-tuning training of the target artificial neural network so that the target artificial neural network performs fine-tuning training on a target task based on a target dataset.

The controlling pre-training of the first artificial neural network and the controlling pre-training of the second artificial neural network may be controlled by the at least one processor so that they are performed independently of each other.

The artificial neural network training method may further include: selecting, by the at least one processor, the first dataset from a reference dataset based on a score of relevance to first basic image data corresponding to the low-level feature; and selecting, by the at least one processor, the second dataset from the reference dataset based on a score of relevance to second basic image data corresponding to the high-level feature.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
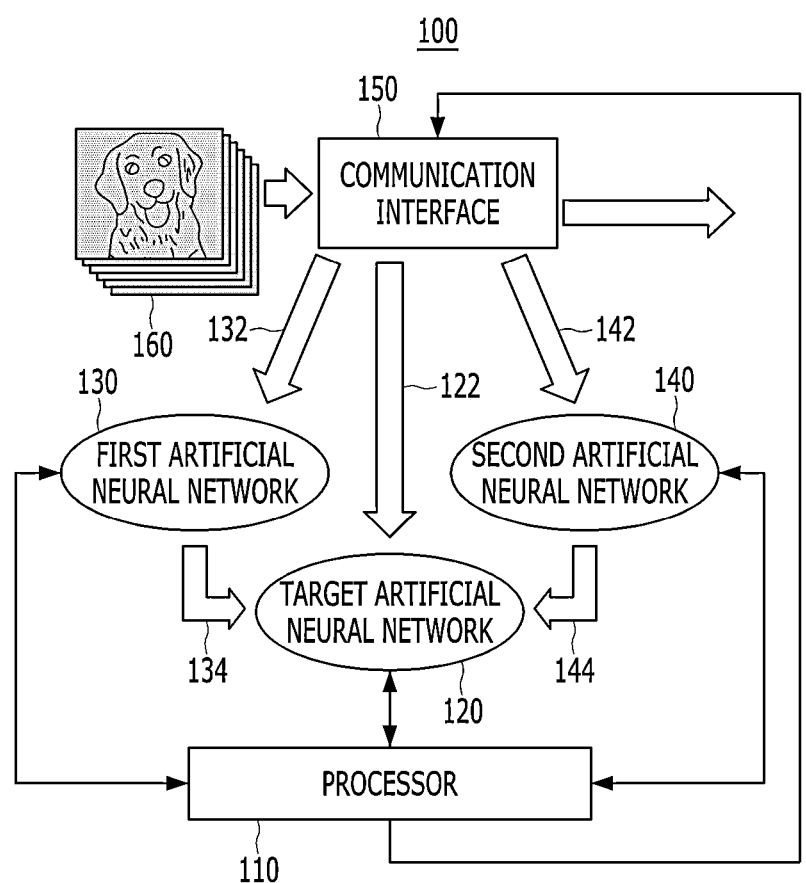
FIG. 1 is a diagram showing the artificial neural network training/learning process of a computing system using machine learning-based artificial intelligence according to an embodiment of the present invention.

Other objects and features of the present invention in addition to the above-described objects will be apparent from the following description of embodiments given with reference to the accompanying drawings.

Embodiments of the present invention will be described in detail below with reference to the accompanying drawings. In the following description, when it is determined that a detailed description of a related known component or function may unnecessarily make the gist of the present invention obscure, it will be omitted.

Deep learning/CNN-based artificial neural network technology, which has recently developed rapidly, is being considered for the purpose of identifying visual elements that are difficult to identify with the human eye when it is applied to the field of imaging. The fields of application of the above technology are expected to expand to various fields such as security, medical imaging, and non-destructive testing.

The present invention is derived from the concept of modularizing and classifying the classification/prediction processes of a complex artificial neural network. In this process, reference will be made to transfer learning among conventional techniques.

Transfer learning is being researched as a means for improving the performance of an artificial neural network when performing learning/training using a smaller amount of data in the case where imbalanced data needs to be used or data required for learning is insufficient. The present invention has been conceived from the motivation to overcome the problems of conventional transfer learning while utilizing the advantages of transfer learning by proposing separable transfer learning.

In one embodiment of the present invention, although the following description will be given primarily for the analysis of image data, the spirit of the present invention is not limited thereto and may be applied to learning/training on text-based data.

In addition, the analysis of image data according to the present invention may be involved in various tasks (classification, segmentation, object detection, generative modeling, etc.). The present invention may be applied to various fields of application (medical imaging, face recognition, image recognition for vehicle autonomous driving, natural object image recognition, etc.), and may also be used as a means for generating customized information for an individual through learning/training on text-based data.

The present invention may provide quantified guidelines for transfer learning that improve the performance of an artificial neural network while utilizing the advantages of artificial neural network learning/training using conventional transfer learning by proposing separable transfer learning.

The present invention may reduce the load of an iterative training process for the provision of quantified guidelines for transfer learning by proposing separable transfer learning. The present invention may induce quantified guidelines for transfer learning to be effectively acquired by effectively selecting datasets of a repeated process.

Artificial neural network technologies using conventional transfer learning are disclosed in, e.g., Korean Patent Application Publication No. 10-2020-0000824 entitled "Deep Learning Model-based Facial Expression Recognition Method using Central Variance Loss Function" and/or U.S. Patent Application Publication No. US 2020/0082210 entitled "Generating and Augmenting Transfer Learning Datasets with Pseudo-Labeled Images." The components of the artificial neural networks using transfer learning disclosed in the preceding documents may be selectively integrated into and used in the above-described present invention as needed for the implementation of the present invention within a range that does not depart from the gist of the present invention.

An image classification apparatus and method using machine learning-based artificial intelligence according to an embodiment of the present invention will be described in detail below with reference to FIGS. 1 to 7.

FIG. 1 is a diagram showing the artificial neural network training/learning process of a computing system 100 using machine learning-based artificial intelligence according to an embodiment of the present invention.

The computing system 100 of FIG. 1 includes at least one processor 110, a target artificial neural network 120, a first artificial neural network 130, a second artificial neural network 140, and a communication module 150. In this case, the communication module 150 may receive input data 160 from the outside of the computing system 100, and may transmit the results of the learning generated by the computing system 100 or the results of inference/analysis to the outside. The communication module 150 operates under the control of the processor 110. The input data 160 may be continuously acquired from the outside, or may be stored in a storage (not shown) inside or outside the computing system 100 and received via the communication module 150 as needed.

A first dataset 132 suitable for the pre-training of the first artificial neural network 130 is selected under the control of the processor 110 from among the input data 160 received via the communication module 150, and may be transmitted to the first artificial neural network 130. The first dataset 132 may be a dataset that is selected to be suitable for a first phase task.

A second dataset 142 suitable for the pre-training of the second artificial neural network 140 is selected under the control of the processor 110 from among the input data 160 received via the communication module 150, and may be transmitted to the second artificial neural network 140. The second dataset 142 may be a dataset that is selected to be suitable for a second phase task.

A target dataset 122 suitable for the fine-tuning training of the target artificial neural network 120 is selected under the control of the processor 110 from among the input data 160 received via the communication module 150, and may be transmitted to the target artificial neural network 120. The target dataset 122 may be a dataset that is selected to be suitable for a target task. For the convenience of description, the target task refers to a task that the computing system 100 of the present invention ultimately intends to solve, and the target dataset 122 is a dataset designated to perform training on the target task.

When the target dataset 122 is imbalanced data or the size of the target dataset 122 is small, the separable transfer learning of the present invention may be applied. The first dataset 132 and/or the second dataset 142 may be selected as an expanded or adjusted dataset by taking into consideration data imbalance or the amount of data. An embodiment in which the first dataset 132 and/or the second dataset 142 is selected as an expanded or adjusted dataset by taking into consideration of data imbalance or the amount of data will be described later with reference to FIG. 8.

The operation of the training/learning process of the artificial neural network performed in the computing system 100 of FIG. 1 will be described together with the outline of the separable transfer learning of FIG. 3 and the operation flowchart of FIG. 4.

Figure 3:
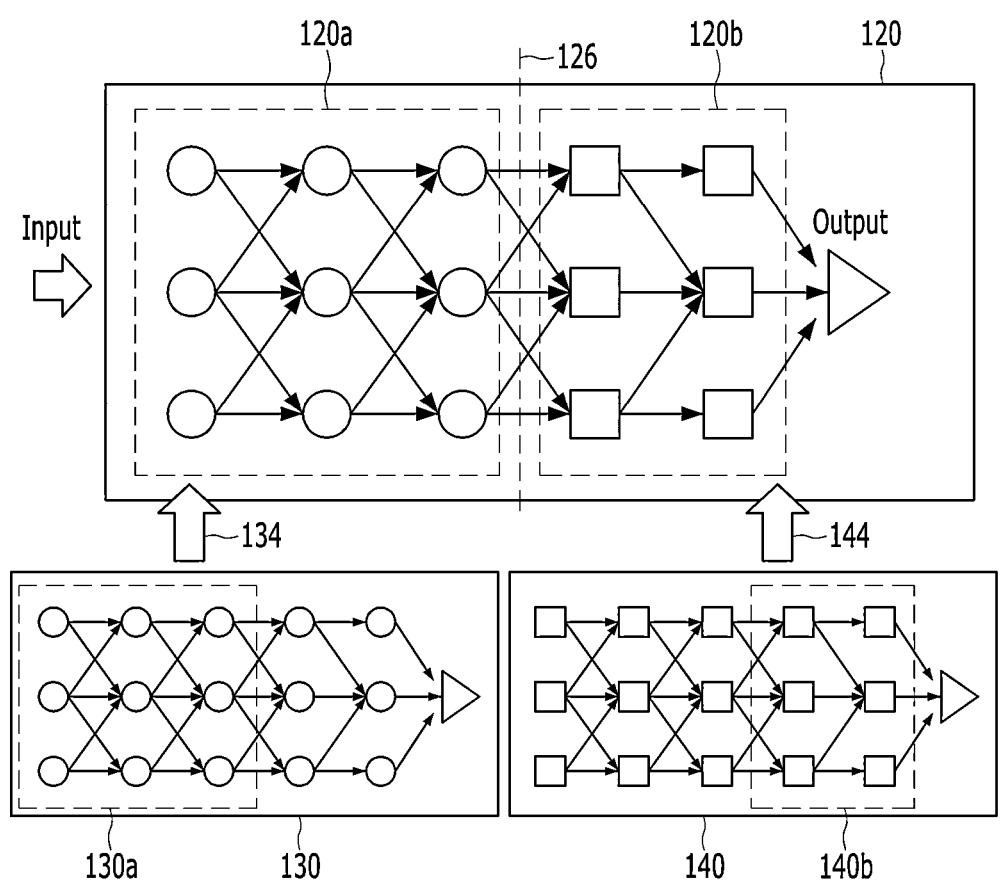
FIG. 3 is a diagram showing a separable transfer learning process performed in a computing system according to an embodiment of the present invention.

FIG. 3 is a diagram showing a separable transfer learning process performed in a computing system according to an embodiment of the present invention.

Figure 4:
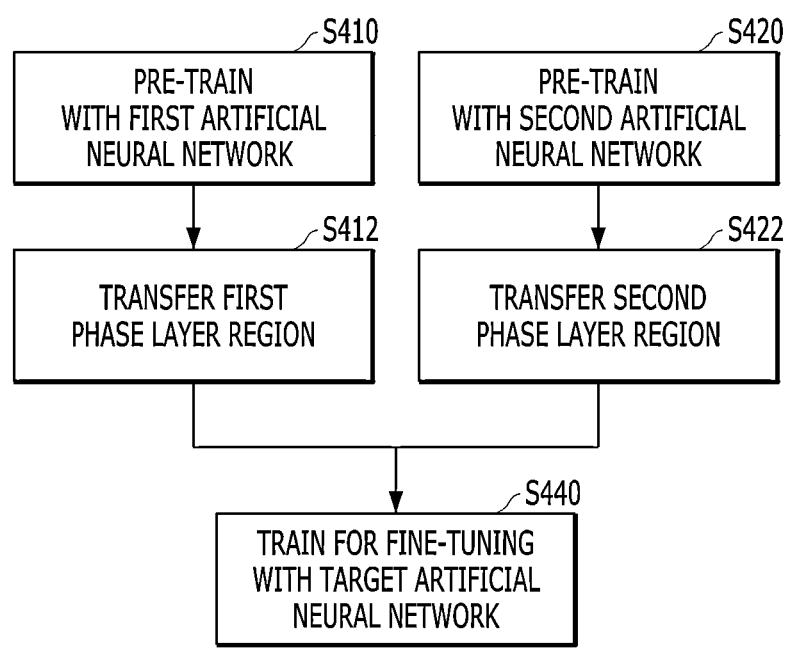
FIG. 4 is an operation flowchart showing a separable transfer learning process performed in a computing system according to an embodiment of the present invention.

FIG. 4 is an operation flowchart showing a separable transfer learning process performed in a computing system according to an embodiment of the present invention.

Referring to FIGS. 1, 3, and 4 together, the processor 110 may control the pre-training of the first artificial neural network 130 so that the first artificial neural network 130 pre-trains on the first phase task based on the first dataset 132 at step S410.

The processor 110 may control the pre-training of the second artificial neural network 140 so that the second artificial neural network 140 pre-trains on the second phase task based on the second dataset 142 at step S420.

Steps S410 and S420 may be controlled independently of each other by the processor 110. In general conventional transfer learning, when the pre-training of the second phase is performed after the pre-training of the first phase or fine-tuning training is performed after the pre-training of the first phase, parameters that are the results of the same pre-training are transferred to a neural network, in which fine-tuning training is performed, as a whole. Accordingly, when transfer learning is used, there is a case where the overall learning time may be shortened or the accuracy of the artificial neural network may be improved due to a final learning result. In conventional transfer learning, no information can be provided to explain why the transfer learning improves the performance of an artificial neural network and to provide guidelines for transfer learning to improve the performance of an artificial neural network.

In the separable transfer learning of the present invention, the first artificial neural network 130 configured to perform the pre-training of the first phase and the second artificial neural network 140 configured to perform the pre-training of the second phase are separated from each other. The present invention is significantly different from the conventional transfer learning technologies in that since the first artificial neural network 130 and the second artificial neural network 140 are separated from each other, the pre-training S410 of the first phase and the pre-training S420 of the second phase may be performed independently of each other and in parallel with each other.

Furthermore, this difference can lead to research into the process by which transfer learning improves the performance of an artificial neural network and guidelines for transfer learning to improve the performance of an artificial neural network. In addition, the separable transfer learning of the present invention may minimize the negative effect of the overfit parameter of pre-training on the final learning result of the target artificial neural network 120, and may improve the prediction/analysis/inference performance of the target artificial neural network 120 for the target task.

In the state in which step S410 is completed, the parameter 134 of the first phase layer 130a of the first artificial neural network 130 is transferred to the first phase layer 120a of the target artificial neural network 120 at step S412. Step S412 is performed in such a manner that the processor 110 controls the first artificial neural network 130 and the target artificial neural network 120.

In the state in which step S420 is completed, the parameter 144 of the second phase layer 140b of the second artificial neural network 140 is transferred to the second phase layer 120b of the target artificial neural network 120 at step S422. Step S422 is performed in such a manner that the processor 110 controls the second artificial neural network 140 and the target artificial neural network 120.

In this case, the "parameter" may be defined to include a weight stored by the layer of the artificial neural network through learning/training.

The first phase layer 130a of the first artificial neural network 130 is a transfer candidate layer to be transferred to the target artificial neural network 120 in relation to the first phase task, and a transfer target candidate layer corresponding to the location of the first phase layer 130a of the first artificial neural network 130 in the target artificial neural network 120 is denoted as the first phase layer 120a of the target artificial neural network 120. In other words, the first phase layers 120a and 130a are a transfer candidate layer and a transfer target candidate layer, respectively, and refer to layers that are present at the corresponding locations of both the artificial neural networks 120 and 130 related to the separable transfer process of the first phase task.

In the same manner, the second phase layer 140b of the second artificial neural network 140 is a transfer candidate layer to be transferred to the target artificial neural network 120 in relation to the second phase task, and the transfer target candidate layer corresponding to the location of the second phase layer 140b of the second artificial neural network 140 in the target artificial neural network 120 is denoted as the second phase layer 120b of the target artificial neural network 120. In other words, the second phase layers 120b and 140b are a transfer candidate layer and a transfer target candidate layer, respectively, and refer to layers that are present at the corresponding locations of both the artificial neural networks 120 and 140 related to the separable transfer process of the second phase task.

FIG. 4 shows an embodiment in which phase layer region information 126 including information about the boundary between the first phase layer 120a or 130a and the second phase layer 120b or 140b is predetermined. In this case, since the step of setting the phase layer region information 126 is omitted, steps S410 and S412 of FIG. 4 are sequentially performed, but may be performed independently of steps S420 and S422 and in parallel with steps S420 and S422.

The separable transfer learning process of the present invention including the step of determining the phase layer region information 126 will be described later with reference to FIG. 6.

When the transfer process of steps S412 and S422 is finished, the processor 110 controls the target artificial neural network 120 so that the target artificial neural network 120 performs fine-tuning training on a target task based on the target dataset 122 at step S440.

Figure 2:
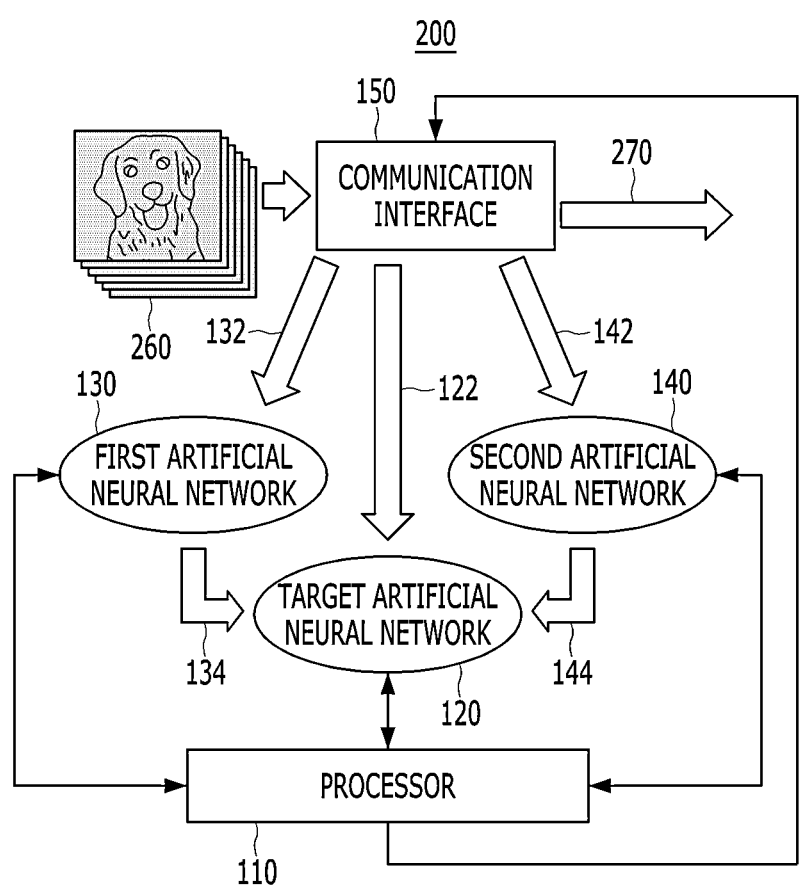
FIG. 2 is a diagram showing the inference process of a computing system using machine learning-based artificial intelligence according to an embodiment of the present invention.

FIG. 2 is a diagram showing the inference process of a computing system 200 using machine learning-based artificial intelligence according to an embodiment of the present invention.

The descriptions of the operations of the processor 110, target artificial neural network 120, first artificial neural network 130, second artificial neural network 140, and communication module 150 of FIG. 2 that are the same as those of FIG. 1 will be omitted here.

The operation of the inference process of the artificial neural network executed in the computing system 200 of FIG. 2 will be described together with the operation flowchart of FIG. 5.

Figure 5:
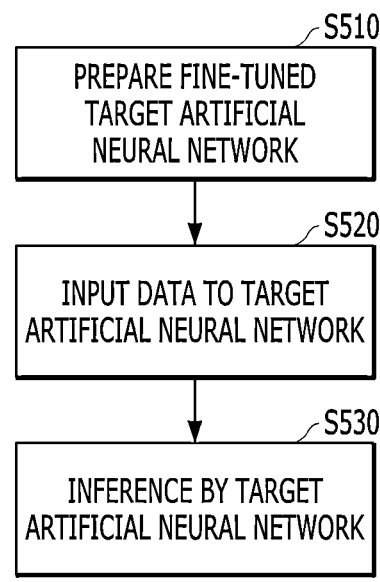
FIG. 5 is an operation flowchart showing an inference process performed after separable transfer learning executed in a computing system according to an embodiment of the present invention has been finished.

FIG. 5 is an operation flowchart showing an inference process performed after separable transfer learning executed in a computing system according to an embodiment of the present invention has been finished.

Referring to FIGS. 2 and 5 together, the target artificial neural network 120 whose fine-tuning training has been completed is prepared at step S510.

New input data 260 corresponding to the target task is input to the target artificial neural network 120, whose fine-tuning training has been completed, via the communication module 150 at step S520.

The target artificial neural network 120 infers the result of the target task based on the new input data 260 and the result parameter of the fine-tuning training at step S530.

The inference result 270 of step S530 is output to an application outside the computing system 200 via the communication module 150 under the control of the processor 110.

Referring back to FIG. 3, a separable transfer learning process executed in the computing system 100 according to the embodiment of the present invention is shown.

According to recent research results, it is known that in an application in which a convolutional neural network (CNN) is used to analyze image data, a low-level feature is extracted from a layer close to input data and a high-level feature is extracted from a layer close to output.

Accordingly, it is known that weights stored in the front layers of an artificial neural network model are associated with the function of extracting low-level features such as edge and color and weights stored in the back layers of the artificial neural network model are associated with the function of extracting high-level features such as the shape of the face and the shape of the eyes.

The pre-training S410 of the first phase task of the present invention may be training that extracts a low-level feature from the first phase layer 130a of the first artificial neural network 130. In this case, it may be expected that a parameter related to the extracted low-level feature is mainly stored in the first phase layer 130a of the first artificial neural network 130.

The pre-training S420 of the second phase task of the present invention may be training that extracts a high-level feature from the second phase layer 140b of the second artificial neural network 140. In this case, it may be expected that a parameter related to the extracted high-level feature is mainly stored in the second phase layer 140b of the second artificial neural network 140.

When the result parameter of the low-level feature pre-training and the result parameter of the high-level feature pre-training are mixed together as in the conventional transfer learning, a parameter overfitting a low-level feature among finally fine-tuned, trained parameters may affect the determination of a high-level feature, or, conversely, a parameter overfitting a high-level feature may affect the determination of a low-level feature.

The separable transfer learning of the present invention transfers the parameter 134, formed in the first phase layer 130a of the first artificial neural network 130 as a result of the pre-training S410 of the first phase task, to the separated first phase layer 120a of the target artificial neural network 120, and also transfers the parameter 144, formed in the second phase layer 140b of the second artificial neural network 140 as a result of the pre-training S420 of the second phase task, to the separated first phase layer 120a of the target artificial neural network 120. Accordingly, there may be minimized a negative effect that the overfitted parameter may have on the finally fine-tuned, trained parameters of the target artificial neural network 120 due to the pre-training.

In this case, the performance of the target artificial neural network 120 for the target task may be optimized by adjusting the phase layer region information 126 including information about the boundary between the first phase layer 120a and the second phase layer 120b.

Figure 6:
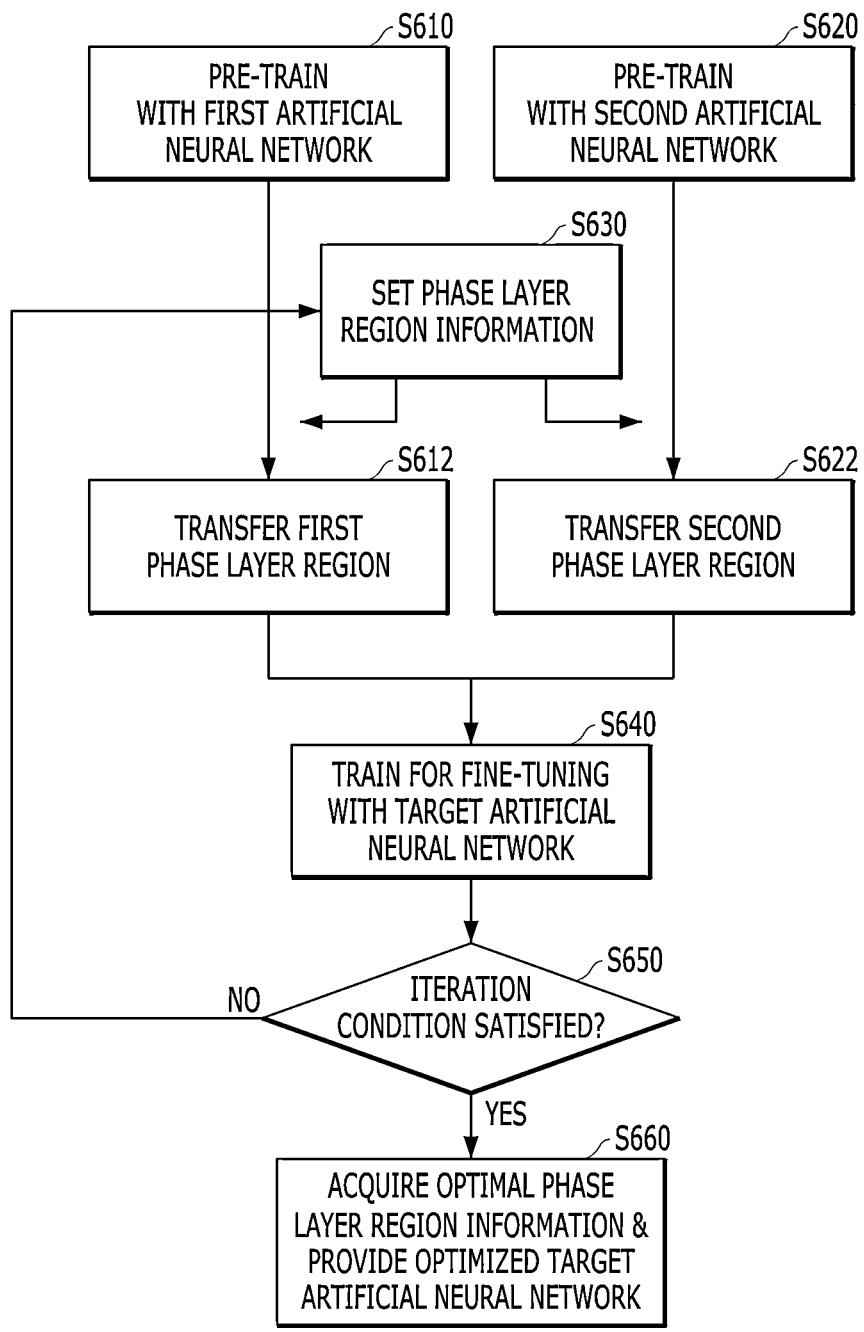
FIG. 6 is an operation flowchart showing the process of searching or optimizing a phase layer region as a separable transfer learning process executed in a computing system according to an embodiment of the present invention.

FIG. 6 is an operation flowchart showing the process of searching or optimizing a phase layer region as a separable transfer learning process executed in a computing system according to an embodiment of the present invention.

After the pre-training S610 of the first phase task using the first artificial neural network 130 and the pre-training S620 of the second phase task using the second artificial neural network 140 have been finished, the phase layer region information 126 based on which the first phase layer 120a and the second phase layer 120b are distinguished in the target artificial neural network 120 may be set by the processor 110 at step S630. In this case, step S630 may be implemented such that a plurality of candidate values for the phase layer region information 126 is set, and may be implemented such that the phase layer region information 126 is adjusted in a manner that improves or optimizes the performance of the target artificial neural network 120 while changing from an initial value according to a predetermined rule.

Based on each of the plurality of candidate values of the phase layer region information 126 set or adjusted by step S630, the parameter (134) transfer S612 of the first phase layer (120a or 130a) region and the parameter (144) transfer S622 of the second phase layer (120b or 140b) region may be sequentially or repeatedly performed under the control of the processor 110.

Based on each of the plurality of candidate values of the phase layer region information 126 set or adjusted by step S630, the target artificial neural network 120 may be sequentially or repeatedly controlled by the processor 110 so that the target artificial neural network 120 performs fine-tuning training on the target task at step S640 after the transfer steps S612 and S622 have been completed.

The phase layer region information 126 may be optimized by the processor 110 so that the target artificial neural network 120 optimizes prediction accuracy for the target task among the plurality of candidate values of the phase layer region information 126 at steps S650 and S660.

Feedback is made to reset or adjust the phase layer region information 126 until a predetermined iteration condition is satisfied at step S650. When the iteration condition is satisfied, the phase layer region information 126, for which the test accuracy of the target artificial neural network 120 is highest in an iterated feedback loop, is acquired as optimal phase layer region information, and the optimal phase layer area information may be applied and also the target artificial neural network 120, whose fine-tuning training has been completed, may be provided for an application of a user as the optimized target artificial neural network at step S660.

In this case, the provided optimized target artificial neural network may operate as the target artificial neural network 120 of FIGS. 2 and 5.

According to an embodiment of step S650, the iteration condition may be designed to repeatedly perform steps S612, S622, and S640 for N candidate values predetermined to be the candidate values of the phase layer region information 126, and may also be designed to select the phase layer region information 126 providing the highest test accuracy as the optimal phase layer region information.

According to another embodiment of the step S650, the iteration condition may be designed to repeatedly perform steps S612, S622, and S640 for a currently set candidate value while increasing the phase layer region information 126 from an initial value, and may also be designed to select the phase layer region information 126 providing the highest test accuracy as the optimal phase layer region information when a predetermined condition is satisfied. In this case, the predetermined condition may be designed to set the number of iterations of the loop (including steps S630, S612, S622, S640, and S650) to a desired number M, or may be designed such that a loop S630, S612, S622, S640, and S650 is repeatedly performed until the test accuracy reaches a preset threshold.

Figure 7:
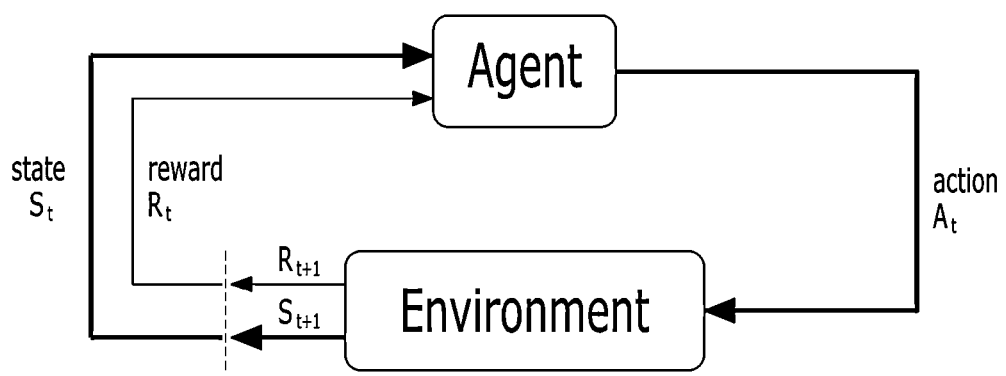
FIG. 7 is a diagram illustrating an outline of reinforcement learning utilized to determine whether the iteration condition of step S650 of FIG. 6 is satisfied in a computing system according to an embodiment of the present invention.

One specific embodiment of step S650 may be implemented using the reinforcement learning shown in FIG. 7.

FIG. 7 is a diagram showing an outline of reinforcement learning utilized in a computing system according to an embodiment of the present invention. FIG. 7 is a view illustrating conventional reinforcement learning. At least part of the reinforcement learning of FIG. 7 may be selectively incorporated into the present invention and used as needed for the implementation of the present invention within the range that does not depart from the gist of the present invention.

For example, policies for action $A_t$ of the agent shown in FIG. 7 may be designed to correspond to the plurality of candidate values of the phase layer region information 126 as in step S630.

Action $A_t$ and step S630 are performed based on the policies. After the fine-tuning training of the target artificial neural network 120 on the tuned phase layer region information 126 has been performed, the test accuracy of the target artificial neural network 120 for the target task may be fed back as state $S_{t+1}$ and reward $R_{t+1}$.

According to the reinforcement learning algorithm of FIG. 7, the phase layer region information 126 may be tuned to increase a test accuracy reward at step S630. For example, when the number of iterations of reinforcement learning is set to M, a previous reward and a current reward are compared with each other, a higher reward is determined to be subsequent phase layer region information 126, and the tuning of the phase layer region information 126 is performed in a manner such as that of a random walk process, a value that is given to the phase layer region information 126 when the predetermined number M of iterations have been completed may be considered to be optimal phase layer region information that has provided the highest test accuracy as the reward during the iterations. In general, although such reinforcement learning may provide more excellent performance as the number M of iterations increases, there is a problem in that simulation time increases accordingly.

The separable transfer learning of the present invention repeatedly performs only the fine tuning S640 using a relatively small amount of data in the state in which parameters of the first artificial neural network 130 and the second artificial neural network 140 are fixed through the pre-training S610 and S620 having a relatively large amount of data and a large training/learning load. Accordingly, even when reinforcement learning or iterative simulation equivalent thereto is performed, iteration time may be relatively reduced and a simulation load attributable to the number of iterations may be reduced.

The reason that the dataset of the pre-training S610 and S620 has a large size and takes a relatively long time and the dataset of the fine tuning S640 has a small size and takes a relatively short time will be described with reference to FIG. 8 below.

Figure 8:
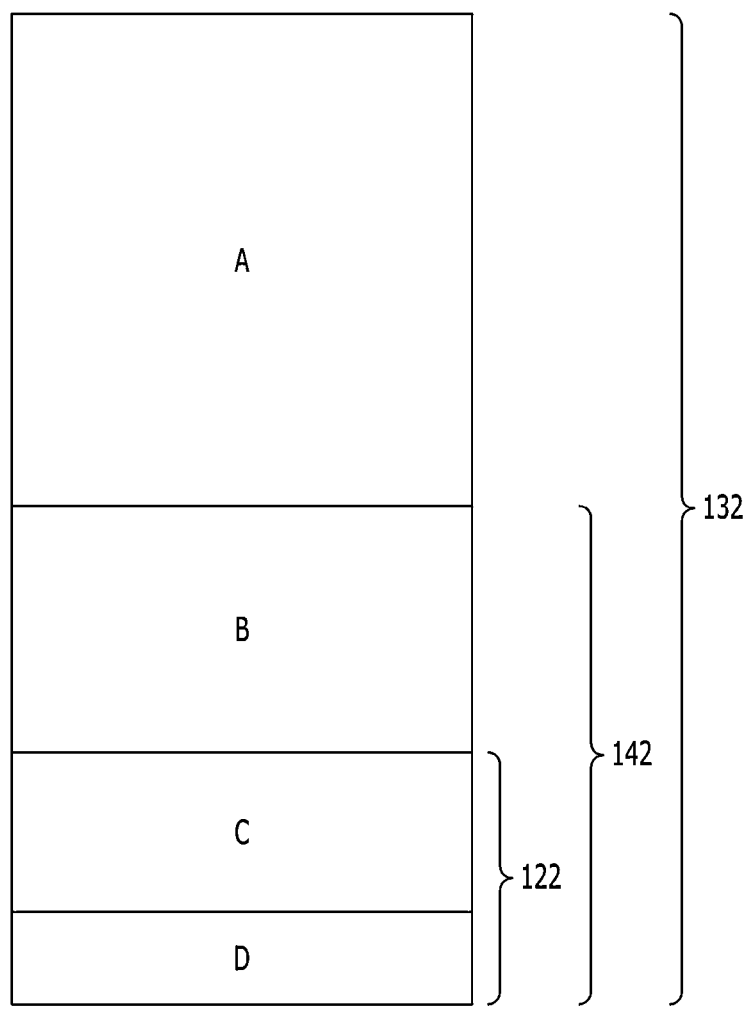
FIG. 8 is a diagram showing an embodiment of selecting a dataset to be applied to each training step of separable transfer learning based on data imbalance in a computing system according to an embodiment of the present invention.

FIG. 8 is a diagram showing an embodiment of selecting a dataset to be applied to each training step of separable transfer learning based on data imbalance in a computing system according to an embodiment of the present invention.

Referring to FIG. 8, the distribution of data according to the types A, B, C, and D of labels is shown. It is assumed that the labels are A, B, C, and D in descending order of dataset size.

In general, a task that is set as a target task is often a significantly specific problem. In other words, an example thereof is the task of recognizing an expression of a face image rather than the task of recognizing a general face.

It is not easy to obtain the dataset C or D even labeled with expressions such as a grimace expression, a sad expression, and a smiling expression. Accordingly, the size of the dataset of the label C or D corresponding to a specific task is often small.

The data that can be obtained relatively easily may be the label B representing general human faces or the label A representing not only humans but also animals.

In this case, for convenience of description, the low-level feature may be a feature that distinguishes humans and animals between the labels A and B, and the high-level feature may be a feature that distinguishes general human faces B and faces C labeled with expressions between the labels B and C.

The target task to be finally solved may be designed as the task of distinguishing a face D labeled with a smiling expression from a face C labeled with another expression. In this case, the target dataset 122 including the label C and the label D may be set to be suitable for the target task.

When the second artificial neural network 140 is desired to pre-train on the task of distinguishing the faces C and D labeled with a high-level feature from the general human faces as a stage of pre-training before the target dataset 122 is applied, a second dataset 142 including labels B, C, and D may be set, and a second task may be designed to distinguish B and C/D.

When the first artificial neural network 130 is desired to pre-train on the task of distinguishing images A of non-human objects labeled with a low-level feature from human faces B as a stage of pre-training before the target dataset 122 is applied, a first dataset 132 including labels A, B, C, and D may be set, and a first task may be designed to distinguish between A and B/C/D.

The process of setting a dataset in a stepwise manner in FIG. 8 may propose a means for solving data imbalance or lack of the target dataset 122.

In general, in the case where a reference dataset that can be obtained through ImageNet includes all labels A to D and a target task is the task of distinguishing label D, when the overall reference dataset is put into fine-tuning training, there frequently occurs a case where appropriate training is not performed due to overfitting attributable to data imbalance. In contrast, when only the target dataset 122 is used from the beginning, there is a concern that sufficient learning is not performed because the size of the dataset is small and also the learning of low-level features is not sufficiently performed.

It may be possible to input the dataset into pre-training for transfer learning in a stepwise manner while expanding the dataset from the target dataset 122 to the reference dataset. Alternatively, it may be possible to select and apply the first dataset 132, the second dataset 142, and the target dataset 122 from the large but imbalanced reference dataset in a stepwise manner while taking into consideration balance.

The process of selecting and applying the first dataset 132, the second dataset 142, and the target dataset 122 from the reference dataset in a stepwise manner while taking into consideration balance may be implemented by appropriately designing high-level features and low-level features as tasks and then selecting datasets suitable for the tasks.

Before the pre-training S410, S420, S610, and S620 is performed, the processor 110 may select the first dataset 132 from the reference dataset based on a score of relevance to first basic image data corresponding to a low-level feature so as to be suitable for the first phase task based on the low-level feature. For example, when the first phase task is the task of distinguishing human faces and animal faces, images having basic shapes such as the outline, edges of eyes, nose, and mouth of a human face, suitable for distinguishing labels A and B, may be selected as the first basic image data.

In the same manner, before the pre-training S410, S420, S610, and S620 is performed, the processor 110 may select the second dataset 142 from the reference dataset based on a score of relevance to second basic image data corresponding to the high-level feature so as to be suitable for the second phase task based on the high-level feature. For example, when the second phase task is the task of distinguishing general human faces from human faces with expressions, images having standardized and complex shapes of outlines, eyes, noses, and mouths of human faces according to expressions of the human faces, suitable for distinguishing the labels A/B and C/D, may be selected as the second basic image data.

As a measure applicable for the scores of relevance to the first basic image data and/or the second basic image data, a method of measuring the distance between vectors by vectorizing image data may be adopted as an example. Well-known techniques as such distances include Euclidian Distance, Manhattan Distance, Minkowski Distance, and/or Cosine Similarity, and the like.

Furthermore, as the Inception Score (IS) for representing the similarity between fake data and real data as a distance in a feature space, Fréchet Inception Distance (FID) may be applied as a measure for measuring the relevance between pieces of image data of the present invention.

A more specific embodiment of a method of applying FID is now described. After feature maps have been extracted in an inception network, the means and variances of the feature maps may be calculated, and similarity/distance may be measured by comparing feature maps of levels suitable for respective portions of an artificial neural network model.

For example, arbitrary candidate data selected from among reference data is input to an inception network via a low-level feature extractor and then a low-level feature map is extracted, and basic data having a low-level feature is input to the inception network and then a low-level feature map is extracted. When the similarity between the feature map extracted from the candidate data and the feature map extracted from the basic data is equal to or higher than a reference value, the candidate data may be selected as a pre-train dataset. In this case, as a method for calculating the similarity, a known similarity calculation method including FID may be applied. In the case where FID is used, as the FID value decreases, the similarity becomes higher. Accordingly, when an FID value is equal to or larger than a reference value, the candidate data is selected as a pre-train dataset.

In the same manner, high-level feature maps of the inception network between basic data having high-level features and candidate data are compared via a high-level feature extractor. Thereafter, based on the FID between the feature maps, the candidate data may be selected as a pre-train dataset when an FID value is equal to or larger than a reference value.

For convenience of description, although the embodiments each including the first artificial neural network 130, the second artificial neural network 140, and the target artificial neural network 120 are shown in FIGS. 1 and 2, respectively, the spirit of the present invention is not limited to the embodiments described therein. For example, when a target task desired to be achieved through fine-tuning training is a highly advanced task, the task of pre-training may be divided into three or more phases, e.g., low-level, mid-level, and high-level features, and then separable transfer learning may be applied. In this case, the number of artificial neural networks required for pre-training for transfer learning may be three, and the phase layer regions of the target artificial neural network 120 may be divided into three or more.

When three or more pre-trained artificial neural networks are applied to the embodiment of reinforcement learning of FIGS. 6 and 7, the phase layer region information of the target artificial neural network 120 may be designed to include two or more boundary line positions, and optimal phase layer region information may be searched for two or more boundary line positions.

When three or more types of pre-training are applied, the process of selecting a pre-train dataset based on the similarity of a feature map may be performed in such a manner that a middle-level feature extractor is designed in addition to a low-level feature extractor and a high-level feature extractor and pre-train datasets suitable for the respective levels are selected.

Furthermore, for convenience of description, in FIGS. 1 and 2, the target artificial neural network 120 is clearly separated from the first artificial neural network 130 and the second artificial neural network 140 and is separately arranged in an initialized state before training. According to various embodiments of the present invention, in the case where the target task is relatively simple, after the pre-training S410 and S420 of the first artificial neural network 130 and the second artificial neural network 140 has been finished, any one of the first artificial neural network 130 and the second artificial neural network 140 may be selected as a target artificial neural network, and then separable transfer learning may be performed.

Although the case of analyzing image data has been mainly described in FIGS. 1 to 8 for convenience of description, the separable transfer learning of the present invention may be applied to text, voice, or audio data.

For example, from text or voice data, the mood, lifestyle, health status, routine, etc. of a person who has generated the text may be extracted through natural language processing or the like. From sound data, the motion, state, or normal/abnormal state of a living or inanimate object may be extracted through voice analysis.

Recently, there are also known cases where in VGGish, i.e., an audio analysis deep learning algorithm, or the like, audio data is visualized in a feature space and converted into image data and pattern recognition technology is applied within the image data, thereby further advancing the pattern analysis of audio data.

Therefore, the task of extracting human emotional state, human psychological state, human lifestyle, health state, etc. by applying the separable transfer learning technology of the present invention to text, voice, and audio data in addition to image data may be designated as a target-specific task and then analyzed and predicted.

Figure 9:
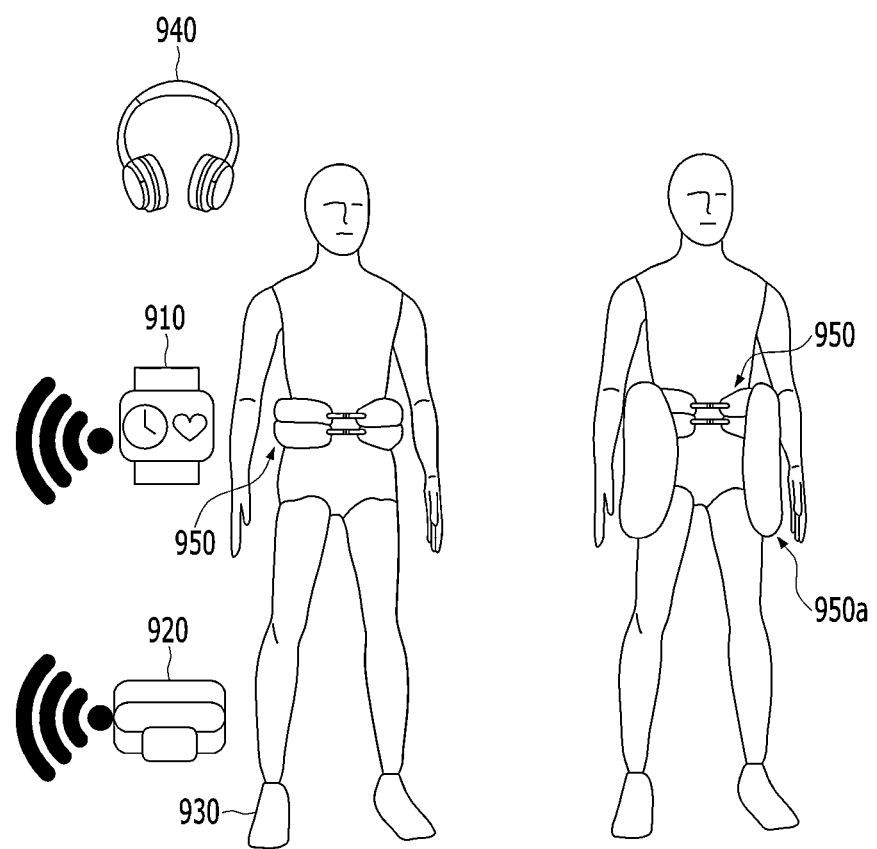
FIG. 9 is a view showing examples of various smart wearable devices capable of supporting a self-management platform in connection with machine learning-based artificial intelligence according to an embodiment of the present invention.

FIG. 9 is a view showing examples of various smart wearable devices capable of supporting a self-management platform in connection with machine learning-based artificial intelligence according to an embodiment of the present invention.

Referring to FIG. 9, a smart watch 910, a smart band 920 worn on the ankle, smart shoes 930, a headset 940, and a smart hip protection/airbag 950 are shown as examples of the smart wearable devices.

The smart wearable devices shown in FIG. 9 may collect information about the behavior, movement path, biosignals, and/or lifestyle of a user, and may analyze or infer information for the self-management of the user in conjunction with an apparatus capable of computing.

For example, the smart watch 910, the smart band 920, the smart shoes 930, and the headset 940 may collect data such as the behavior, exercise habit, and movement path of the user, may collect and analyze the bio-signals of the user, and may suggest an appropriate exercise guideline as a self-management process suitable for the user and a movement path intended to lead the user to walk over a short distance to the user.

For safety of the user, the smart devices may detect a fall or inversion of the user by collecting and analyzing inertial sensor data, and may operate the smart hip protection/airbag 950 in response thereto.

FIG. 9 indicates that the airbag 950 may have the same shape as a deployed airbag 950a when the airbag 950 is operated and deployed. The smart hip protection/airbag 950 is configured to protect the human body from falling, and may be worn on the human body through an external case that can be attached to the waist of the human body. The smart hip protection/airbag 950 includes a sensor configured to detect the movement of the human body and to determine whether a fall has occurred. When the inclination of the wearer is detected by the sensor and a fall is predicted, the airbag is immediately inflated and deployed to form the unfolded airbag 950a and protects the human body. In particular, the deployed airbag 950a surrounds the hip and hip joint and prevents injury to the hip joint region from the impact of a fall. Those having ordinary skill in the art can clearly understand the operating principle of the smart hip protection/airbag 950 from what are disclosed in Korean Patent Application Publication No. 10-2014-0119529 entitled "Human Body Protection Device, and Operation Control System and Method Thereof."

The artificial neural network using the separable transfer learning of FIGS. 1 to 8 may also be applied to the operation of detecting the risk of a fall of the human body and momentarily deploying the airbag 950.

The activity and motion of the user may be identified through the airbag 950 or a separate smart device. For example, a gyroscope, an accelerometer, and an altitude sensor, a pressure sensor, and a proximity sensor may be used to identify the motion of the user, and a rotation sensor, a gravity sensor, and an angular sensor may also be used to identify the motion of the user.

In this case, since the spontaneous pattern of sensor data needs to be recognized and the airbag needs to be deployed before the user comes into collision with the ground, it is necessary to recognize the pattern of sensor data at a considerably fast moment.

To this end, when the pattern recognition of sensor data is learned through an artificial neural network, the fact that the size of a dataset corresponding to a target task to be learned is not large may reduce learning efficiency.

In the case of motion sensor data, it is divided into data such as data on standing still, data on walking, data on running, data on sitting on a desk/chair, data on squatting, data on lying down, and data on falling. Data on riding in a vehicle, data on riding a bicycle, and data on a leaning body may be classified separately. In reality, data on falling is considerably scarce and the proportion of data on falling in the overall motion dataset is low so that learning efficiency is lowered due to imbalanced data. Motion sensor data may be collected and analyzed, for example, by extracting sensor signal patterns regarding the motion of the lower extremities via sensors worn on the hip joint, the ankle, and the knee.

In this case, the separable transfer learning of the present invention may improve learning efficiency by resolving the imbalance of motion sensor data and classifying datasets that can be applied to the transfer learning in a stepwise manner. For example, pre-training on the most data-rich and easy-to-separate data on standing still may be performed in the first phase so that the data can be separated from other data. In another phase, there may be performed pre-training on the task of separating data on walking from datasets of data on running, sitting, squatting, and falling. In another phase, there may be performed pre-training on the task of separating data about running from datasets of data on the desk sitting, squatting, and falling.

Finally, the task of separating data on falling from data on sitting and squatting may be learned through fine-tuning training.

For example, when it is predicted that the probability of a fall is higher than a threshold by analyzing the current motion data of a current user, the system may transmit a control signal and/or command to a peripheral device in order to implement an option for the protection of the user based on the result of the prediction of the artificial neural network. In this case, the peripheral device is, e.g., an airbag deployment control device. When it is predicted that the user's risk of falling is high, the airbag is deployed before the user comes into collision with the ground and prevents injury to the user, in particular injury to the hip or hip joint of the user.

The task of performing final detection from such an asymmetric dataset may be implemented using separable transfer learning, and separable transfer learning may be used throughout the pattern recognition of sensor data.

The separable transfer learning may be utilized to detect a risk factor related to the health of the user by recognizing the pattern of biosignal data. Examples of such biosignals include electrocardiogram (ECG), photoplethysmogram (PPG), galvanic skin response (GSR), skin temperature, humidity, and electroencephalogram (EEG) signals.

The self-management platform of the present invention may extract the constitution, special situation, and lifestyle of the user including the eating habits of the user as the personal characteristic information of the user by analyzing a pre-question survey or collected data.

When the user is an elderly person or a member of a high-risk group with a high probability of falling, the self-management platform of the present invention may recommend a product such as the smart hip protection/airbag 950 to the user based on the user experience of another person. In addition, the self-management platform of the present invention may recommend the user experience of another person based on the personal characteristic information of the user, and may support the user in performing a self-management process based on the excellent user experience of another person.

For example, when the self-management platform recognizes through a smart device that a user classified as a member of a high-risk group related to falling based on personal characteristic information has an intention to go out, it may provide a notification recommending the wearing of the smart hip protection/airbag 950 through the smart device. Furthermore, the self-management platform may predict the time when the user is likely to go out by tracking the schedule of the user recorded on the smart device and the daily lifestyle of the user, and may provide notification recommending the wearing of the smart hip protection/airbag 950 through the smart device at that time point.

Furthermore, when it is predicted that the time has come to start an external activity such as jogging, walking, or simple exercise by taking into consideration the recorded schedule and daily lifestyle of the user, the self-management platform may recommend the wearing of an appropriate smart wearable device, and may start communication with the smart wearable device to collect biosignals and data on movement paths and/or the like.

Figure 10:
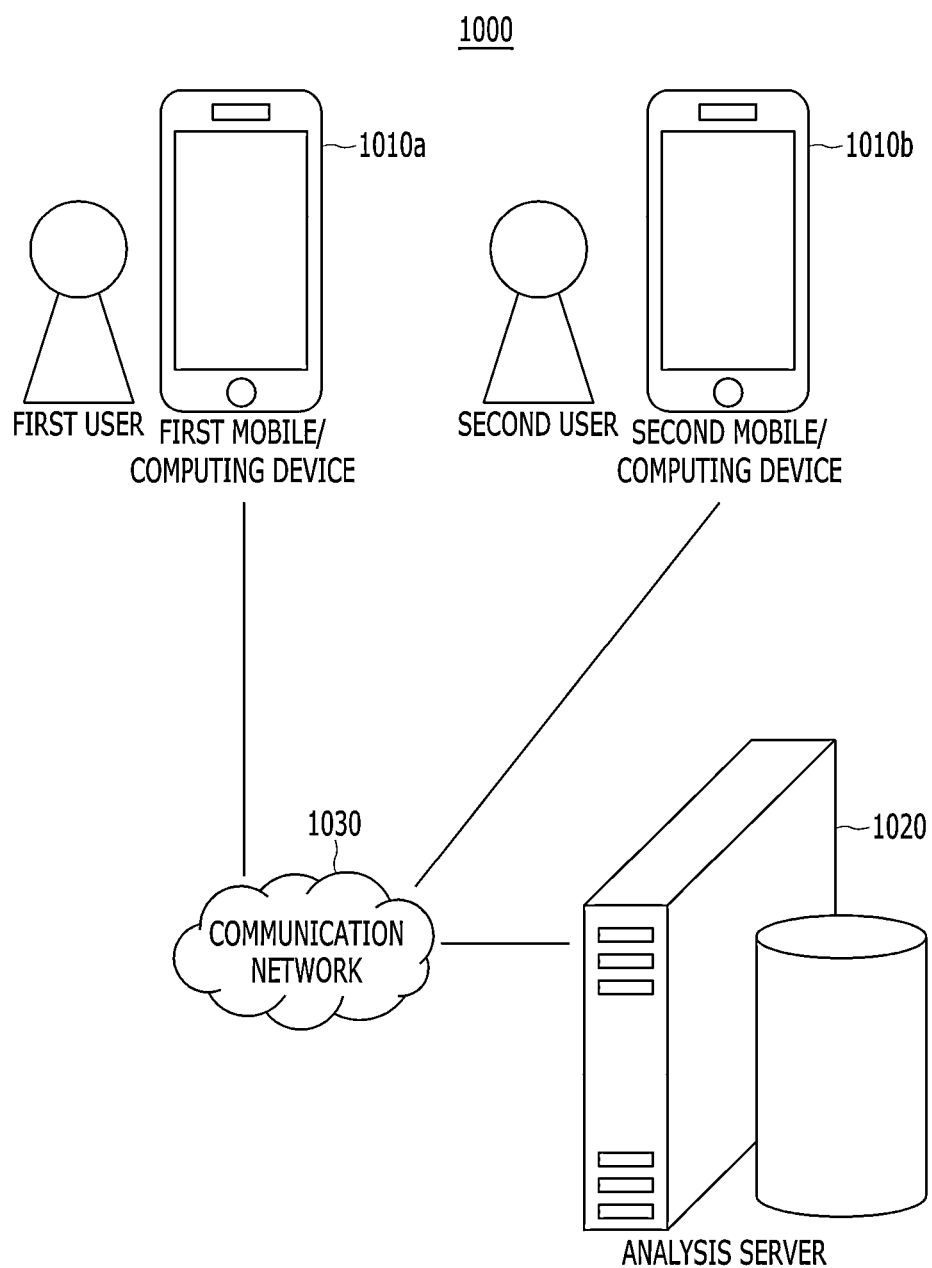
FIG. 10 is a diagram showing a self-management platform system that provides a self-management platform in connection with mobile/computable devices of various users using machine learning-based artificial intelligence according to an embodiment of the present invention.

FIG. 10 is a diagram showing a self-management platform system 1000 that provides a self-management platform in connection with mobile/computable devices of various users using machine learning-based artificial intelligence according to an embodiment of the present invention.

Referring to FIG. 10, the self-management platform system 1000 according to the present embodiment includes the first mobile/computing device 1010a of a first user, the second mobile/computing device 1010b of a second user, and an analysis server 1020. Each of the first mobile/computing device 1010a and the second mobile/computing device 1010b may communicate with the analysis server 1020 over a communication network 1030.

For convenience of description, it is assumed that the first user is a user who generates a user experience for his/her self-management process and routine and the second user is a user who shares or receives a recommendation of the user experiences of other users in order to find his/her self-management process and routine.

In FIG. 10, there are shown the first mobile/computing device 110a and the second mobile/computing device 110b. This is provided only as an example for convenience of description. It will be apparent to those having ordinary skill in the art that the user may communicate with the analysis server 120 over the communication network 130 using a variety of known devices capable of computing and utilize the user experience-based self-management platform of the present invention.

The analysis server 120 of FIG. 10 may collect user experience data for the user through the separable transfer learning-based artificial neural network learning/training process shown in FIGS. 1 to 8. Both the first and second users may transfer their personal characteristic information to the analysis server 1020 via the mobile/computing devices 1010a and 1010b through responses to surveys.

The analysis server 1020 may classify and store, e.g., the personal characteristic information of the first user and the history of the execution of the self-management process by the first user as user experience data for self-management. Furthermore, the analysis server 1020 may accumulate the personal characteristic information of the first user-user experience data as back data used to support the self-management platform by storing the personal characteristic information of the first user and the user experience data of the first user in association with each other.

The analysis server 1020 may collect the personal characteristic information of a plurality of users, including the first user, and user experience data of the self-management process, and may learn the relationship between the personal characteristic information and the user experience data using the collected data through the separable transfer learning-based artificial neural network training/learning process shown in FIGS. 1 to 8.

The analysis server 1020 may infer the excellent user experience data of another person suitable for the second user by inputting the personal characteristic information of the second user, who is a new user, into the fine-tuned, trained artificial neural network. The inferred user experience data may be recommended to the second user, through which the analysis server 1020 may support the self-management process of the second user.

Furthermore, as a result of the analysis server 1020 analyzing the personal characteristic information and current user experience data of the second user in the process of collecting and tracking the user experience data of the second user, the analysis server 1020 may infer the user experience data of another person more suitable for the second user than the current user experience data of the second user, and may recommend it as a self-management process of the second user.

When the analysis server 1020 utilizes the separable transfer learning of FIGS. 1 to 8 for the learning of personal characteristic information and user experience data, the first phase task may be the task of classifying the user experience data of a high-age user from the personal characteristic information of a general user by taking into consideration data balance. The target task may be the task of classifying the user experience data of a user who is a member of a high-risk group, prevents an accident and a risk by appropriately using the smart wearable device, and is successfully performing the self-management process.

When the analysis server 1020 utilizes the separable transfer learning of FIGS. 1 to 8 for the learning of personal characteristic information and user experience data, the first phase task may be the task of classifying the user experience data of a user suffering from skin trouble from a general user's personal characteristic information by taking into consideration data balance. The second phase task may be the task of classifying user experience data of a user who suffers from more severe skin trouble. The target task may be the task of classifying the user experience data of a user who suffers from severe skin trouble, overcomes the skin trouble using the smart wearable device and/or an appropriate skin care product, and is successfully performing the self-management process.

In this case, while providing the second user with the successful user experience data of another person, the analysis server 1020 may introduce a product related to the successful user experience data to the second user, and may provide a menu, where the product can be purchased, to the second user through the second mobile/computing device 1010b.

In an embodiment in which the analysis server 1020 and the platform system 1000 focus on the pattern recognition of the sensing data of the smart device, in order to identify motion data classified as a specific movement, until the target task of identifying target motion data exhibiting an imbalanced distribution in an overall motion dataset is reached, the motion dataset may be divided in a stepwise manner and then subjected to pre-training, and finally the target task may be subjected to fine-tuning training. One of such embodiments is the recognition of the pattern of sensing data that operates in conjunction with the smart wearable devices of FIG. 9 described above.

According to the present invention, the performance of an artificial neural network can be improved even when it is necessary to use imbalanced data or when there is insufficient data required for learning and thus learning is performed using a small amount of data.

The present invention can be applied to various fields of application (medical imaging, face recognition, image recognition for vehicle autonomous driving, natural object image recognition, etc.), and can be applied to various tasks (classification, segmentation, object detection, generative model, etc.).

The artificial neural network learning/training technique according to the present invention can be applied not only to learning based on image data but also to learning based on text data or sensor data.

The present invention can provide quantified guidelines for transfer learning that improves the performance of an artificial neural network by proposing separable transfer learning while utilizing the advantages of artificial neural network learning/training using conventional transfer learning.

The present invention can reduce the load of an iterative training process for providing quantified guidelines for transfer learning by proposing separable transfer learning. The present invention can induce quantified guidelines for transfer learning to be effectively acquired by effectively selecting datasets of an iterated process.

The present invention can provide a self-management platform that utilizes separable transfer learning to learn the relationship between the user experience data and personal characteristic information of a user for self-management and recommends user experience data suitable for the user as a self-management process based on the learning.

The present invention can support a self-management process for the healthcare and injury prevention of a user by analyzing the personal characteristic information and user experience data of the user, and can recommend the user experience of another person and a related product for the healthcare and injury prevention of the user in association with various smart wearable devices.

In particular, the present invention can provide a self-management platform that provides notification of the wearing of equipment such as a smart hip protection airbag for performing protection of the hip/hip joint to prevent injury to the elderly and manages the health of a user.

The present invention utilizes separable transfer learning to recognize the pattern of the sensing data of a smart device and determines the current state of a user based on the recognition, in particular, detects an urgent change in the state of the user at an early stage and provides an appropriate response.

The present invention can receive the sensing data of smart devices, e.g., electrocardiogram (ECG), photoplethysmogram (PPG), galvanic skin response (GSR), skin temperature, humidity, and electroencephalogram (EEG) signals as biosignals, and can recognize the pattern of the signals.

The present invention can utilize separable transfer learning for the purpose of identifying the activity and motion of a user, and, for this purpose, can recognize the pattern of the data of a gyroscope, an accelerometer, and an altitude sensor, a pressure sensor, a proximity sensor, and/or the like. The pattern recognition technology of the present invention may be used for a rotation sensor, a gravity sensor, an angular sensor, and the like as a virtual sensor.

In particular, the present invention may be applied to an analysis technique that, when a device such as a smart hip protection airbag configured to protect the hip/hip joint to prevent injury is worn, detects the risk of a fall of a user by detecting the movement of the user and effectively deploys an airbag before the user comes into collision with the ground.

The method using machine learning-based artificial intelligence according to an embodiment of the present invention may be implemented in the form of program instructions executable by a variety of computing means, and may be then recorded in a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. These hardware devices may be configured to operate as one or more software modules in order to perform the operation of the present invention, and the vice versa.

However, the present invention is not limited to the embodiments. Like reference symbols in the drawings designate like components. The lengths, heights, sizes, widths, etc. introduced in the embodiments and drawings of the present invention may be exaggerated to help to understand.

Although the present invention has been described with reference to specific details such as the specific components, and the limited embodiments and drawings, these are provided merely to help a general understanding of the present invention, and the present invention is not limited thereto. Furthermore, those having ordinary skill in the art to which the present invention pertains may make various modifications and variations from the above detailed description.

Therefore, the spirit of the present invention should not be defined based only on the described embodiments, and not only the attached claims but also all equivalent to the claims should be construed as falling within the scope of the spirit of the present invention.

What is claimed is:

1. A computing system using machine learning-based artificial intelligence, the computing system comprising:
   at least one processor;

a first artificial neural network configured to be pre-trained on a first phase task based on a first dataset;
a second artificial neural network configured to be pre-trained on a second phase task based on a second dataset; and
a target artificial neural network configured to be trained on a target task based on a target dataset,
wherein the at least one processor is configured to:
control a first pre-training of the first artificial neural network on the first phase task based on the first dataset and a second pre-training of the second artificial neural network on the second phase task based on the second dataset to be performed independently of each other;
set a plurality of candidates for phase layer region information including a boundary, based on which a first target phase layer and a second target phase layer are distinguished from each other in the target artificial neural network;
control a first transfer of, for each of the plurality of candidates, a parameter of a first phase layer of the first artificial neural network to the first target phase layer of the target artificial neural network after the first pre-training of the first artificial neural network, wherein the first phase layer is determined based on the first target phase layer;
control a second transfer of, for each of the plurality of candidates, a parameter of a second phase layer of the second artificial neural network to the second target phase layer of the target artificial neural network after the second pre-training of the second artificial neural network, wherein the second phase layer is determined based on the second target phase layer;
control, for each of the plurality of candidates, the target artificial neural network to perform fine-tuning training on the target task after the first transfer of the parameter of the first phase layer of the first artificial neural network and the second transfer of the parameter of the second phase layer of the second artificial neural network; and
determine the phase layer region information from among the plurality of candidates based on respective prediction accuracy for the target task provided by the target artificial neural network performing the first transfer, the second transfer, and the fine-tuning training for each of the plurality of candidates,
wherein the target dataset, the first dataset, and the second dataset are selected based on personal characteristic information and schedule and lifestyle data of a user,
wherein the at least one processor is configured to infer a time point, at which a need for the user to wear a smart wearable device is recognized to be high, based on results of learning for the schedule and lifestyle data of the user, and
wherein the smart wearable device comprises at least one selected from the group consisting of a smart hip protection for preventing an injury to the user, and a smart healthcare device capable of detecting biosignals.

2. The computing system of claim 1, wherein the at least one processor is configured to:
set policies for reinforcement learning so that they can correspond to the plurality of candidates for the phase layer region information; and
acquire the optimal phase layer information by performing fine-tuning training corresponding to the above policies, setting test accuracy for the target task as a reward of the reinforcement learning, and then performing the reinforcement learning.

3. The computing system of claim 1, wherein the target task, the first phase task, and the second phase task are tasks of analyzing an image, and
wherein the first dataset is prepared for extraction of a lower level feature than the second dataset, and the second dataset is prepared for extraction of a higher level feature than the first dataset.

4. The computing system of claim 3, wherein the first dataset is a dataset selected based on a score of relevance to first basic image data corresponding to the lower level feature, and
wherein the second dataset is a dataset selected based on a score of relevance to second basic image data corresponding to the higher level feature.

5. The computing system of claim 1, wherein the computing system further comprises a third artificial neural network configured to be pre-trained on a third phase task based on a third dataset,
wherein the at least one processor is configured to transfer a parameter of a third phase layer of the third artificial neural network to a third target phase layer of the target artificial neural network after pre-training of the third artificial neural network, and
wherein the at least one processor is configured to control so that the target artificial neural network performs fine-tuning training on the target task after the transfer of the parameter of the first phase layer of the first artificial neural network, the transfer of the parameter of the second phase layer of the second artificial neural network, and the transfer of the parameter of the third phase layer of the third artificial neural network.

6. A computing system using machine learning-based artificial intelligence, the computing system comprising:
at least one processor,
a first artificial neural network configured to be pre-trained on a first phase task based on a first dataset; and
a second artificial neural network configured to be pre-trained on a second phase task based on a second dataset,
wherein the at least one processor is configured to:
determine the second artificial neural network as a target artificial neural network configured to be trained on a target task based on a target dataset after a first pre-training of the first artificial neural network on the first phase task based on the first dataset and a second pre-training of the second artificial neural network on the second phase task based on the second dataset;
control the first pre-training of the first artificial neural network and the second pre-training of the second artificial neural network to be performed independently of each other;
set a plurality of candidates for phase layer region information including a boundary, based on which a first target phase layer and a second target phase layer are distinguished from each other in the target artificial neural network;
control a transfer of, for each of the plurality of candidates, a parameter of a first phase layer of the first artificial neural network to the first target phase layer of the target artificial neural network after the first pre-training of the first artificial neural network and the second pre-training of the second artificial neural network, wherein the first phase layer is determined based on the first target phase layer;

control, for each of the plurality of candidates, the target artificial neural network to perform fine-tuning training on the target task after the transfer of the parameter of the first phase layer of the first artificial neural network to the target artificial neural network; and determine the phase layer region information from among the plurality of candidates based on respective prediction accuracy for the target task provided by the target artificial neural network performing the transfer and the fine-tuning training for each of the plurality of candidates, wherein the target dataset, the first dataset, and the second dataset are selected based on personal characteristic information and schedule and lifestyle data of a user, wherein the at least one processor is configured to infer a time point, at which a need for the user to wear a smart wearable device is recognized to be high, based on results of learning for the schedule and lifestyle data of the user, and wherein the smart wearable device comprises at least one selected from the group consisting of a smart hip protection for preventing an injury to the user, and a smart healthcare device capable of detecting biosignals.

7. An artificial neural network training method executed in a computing system including a machine learning-based artificial neural network, the artificial neural network training method comprising:

controlling, by at least one processor in a computing system, a first pre-training of a first artificial neural network so that the first artificial neural network is pre-trained on a first phase task based on a first dataset;

controlling, by the at least one processor, a second pre-training of a second artificial neural network so that the second artificial neural network is pre-trained on a second phase task based on a second dataset, wherein the first pre-training of the first artificial neural network on the first phase task based on the first dataset and the second pre-training of the second artificial neural network on the second phase task based on the second dataset are controlled to be performed independently of each other;

setting, by the at least one processor, a plurality of candidates for phase layer region information including a boundary, based on which a first target phase layer and a second target phase layer are distinguished from each other in a target artificial neural network;

controlling a first transfer of, by the at least one processor, for each of the plurality of candidates, a parameter of a first phase layer of the pre-trained first artificial neural network to a first target phase layer of the target artificial neural network, wherein the first phase layer is determined based on the first target phase layer;

controlling a second transfer of, by the at least one processor, for each of the plurality of candidates, a parameter of a second phase layer of the pre-trained second artificial neural network to a second target phase layer of the target artificial neural network, wherein the second phase layer is determined based on the second target phase layer;

controlling, by the at least one processor, for each of the plurality of candidates, fine-tuning training of the target artificial neural network so that the target artificial neural network performs fine-tuning training on a target task based on a target dataset;

determining, by the at least one processor, the phase layer region information from among the plurality of candidates based on respective prediction accuracy for the target task provided by the target artificial neural network performing the first transfer, the second transfer, and the fine-tuning training for each of the plurality of candidates; and providing, by the at least one processor, the target artificial neural network, fine-tuned and trained based on the determined phase layer region information, as a final target artificial neural network to a user, wherein the target dataset, the first dataset, and the second dataset are selected based on personal characteristic information and schedule and lifestyle data of a user, wherein the at least one processor is configured to infer a time point, at which a need for the user to wear a smart wearable device is recognized to be high, based on results of learning for the schedule and lifestyle data of the user, and wherein the smart wearable device comprises at least one selected from the group consisting of a smart hip protection for preventing an injury to the user, and a smart healthcare device capable of detecting biosignals.

8. The artificial neural network training method of claim 7, wherein the setting a plurality of candidates comprises setting policies for reinforcement learning so that they correspond to the plurality of candidates for the phase layer region information, wherein for each of the plurality of candidates, transferring, by the at least one processor, the parameter of the first phase layer of the first artificial neural network to the first target phase layer of the target artificial neural network, for each of the plurality of candidates, transferring, by the at least one processor, the parameter of the second phase layer of the second artificial neural network to the second target phase layer of the target artificial neural network, and controlling, by the at least one processor, the fine-tuning training of the target artificial neural network are repeatedly executed during the reinforcement learning, and wherein the acquiring optimal phase layer region information is executed during the reinforcement learning by setting test accuracy of the target artificial neural network, fine-tuned and trained according to the policies, for the target task as a reward of the reinforcement learning.

9. The artificial neural network training method of claim 7, wherein the target task, the first phase task, and the second phase task are tasks of analyzing an image, wherein the first dataset is prepared for extraction of a lower level feature than the second dataset, and the second dataset is prepared for extraction of a higher level feature than the first dataset, and wherein the artificial neural network training method further comprises:

selecting, by the at least one processor, the first dataset from a reference dataset based on a score of relevance to first basic image data corresponding to the lower level feature; and selecting, by the at least one processor, the second dataset from the reference dataset based on a score of relevance to second basic image data corresponding to the higher level feature.

* * * * *